H. HESS.
DRIVING BELT.
APPLICATION FILED OCT. 22, 1909.
1,113,438.
Patented Oct. 13, 1914.
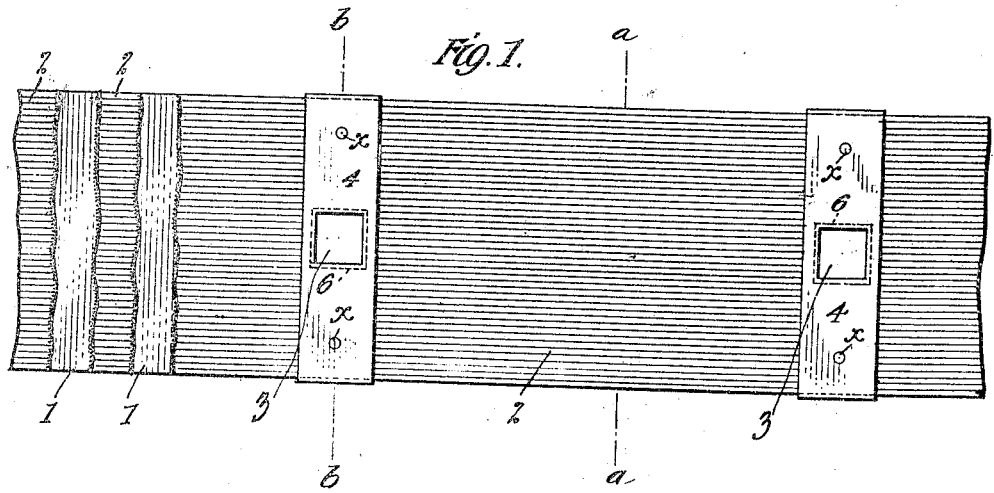
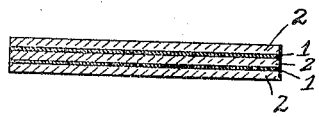
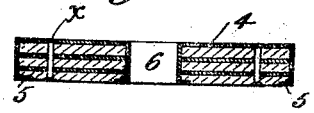
Witnesses:
Inventor:
HENRY HESS
By his Attorneys
Rogers & Kennedy

UNITED STATES PATENT OFFICE.

HENRY HESS, OF WAWA, PENNSYLVANIA.

DRIVING-BELT.

1,113,438.  Specification of Letters Patent.  Patented Oct. 13, 1914.

Application filed October 22, 1909. Serial No. 524,014.

*To all whom it may concern:*

Be it known that I, HENRY HESS, a citizen of the United States, residing at Wawa, in the county of Delaware and State of Pennsylvania, have invented certain new and useful Improvements in Driving-Belts, of which the following is a specification, reference being had therein to the accompanying drawing.

This invention relates to driving belts for transmitting power, the object being to provide a belt which will combine a positive driving action and a frictional driving action, thereby securing the maximum power transmission with silent operation.

With this object in view, my invention consists primarily in forming the belt of a plurality of layers of flexible material provided at intervals with tooth engaging holes to receive the teeth on the driving and driven pulleys or wheels, whereby by the coöperation of the teeth in the holes a positive driving action is secured, and whereby by the coöperation of the surface of the belt with the surface of the pulley a frictional driving action is secured.

The invention consists also in connecting the layers of the belt together at intervals, corresponding with the location of the holes, with connecting devices narrow in proportion to their transverse extent and provided with tooth engaging surfaces, whereby the tooth pressure on the layers will be distributed over a wide area of the belt.

In the accompanying drawings: Figure 1 is a plan view of my improved belt. Fig. 2 is a cross-section of the same on the line *a—a*. Fig. 3 is a similar view on the line *b—b*. Fig. 4 is a cross-section of the belt in modified form.

Referring to the drawings: My improved belt consists of superposed layers 1 and 2 of flexible materials, preferably dissimilar in character, such as thin metal and a relatively thick softer material, as leather, canvas, or the like. In Fig. 1 I have shown five of such layers, 1 representing the thin metal layer, and 2 the thick leather layer. These layers are provided at intervals with perforations 3 forming tooth engaging holes in which the teeth of the driving and driven pulleys are adapted to extend and effect a positive driving action between the parts. The surface of the belt surrounding and between the holes is flat and adapted to bear flatly against and embrace the rim of the pulley and in this manner effect a frictional driving action between the parts.

In order that the tooth pressure on the belt may be distributed over a wide area of the same and not be confined to the points of immediate contact of the teeth in the holes, I apply to the belt at intervals corresponding to the holes therein, transverse devices 4 in the form of metal plates or straps formed with openings corresponding to those in the belt, the walls of which openings constitute tooth engaging surfaces. These plates are narrow in proportion to their transverse extent and are firmly secured to the belt in any suitable manner. In the present instance, they are shown as being fastened by rivets *x*, *x*, and as having their ends bent around the edges of the belt, as at 5, to tightly embrace the same. They are further shown as being provided with thimbles or eyes 6 extending in the holes in the belt and serving to protect the edges of the layers by preventing the driving teeth from direct contact therewith. In this construction it will be seen that the pressure of the teeth in the sockets or thimbles will be transmitted to the transverse plates and by them transmitted throughout the width of the belt. By reason of the fact that the plates are narrow in proportion to their transverse extent, they will not interfere with the flexibility of the belt, or prevent the same from closely hugging the curved surfaces of the pulleys.

In Fig. 4 I have shown a modified form of the belt. In this case, the layers 1ª, 1ᵇ, etc., are all of thin metal, and between these layers are interposed thin sheets 7 of paper cork or similar flexible material, which may be connected to one of the metal layers or not, according to the thickness of the sheet. This construction produces a belt substantially of metal, and of a flexibility far in excess of a solid metal body of the same thickness.

The formation of the belt as described as a composite structure gives to the same all of the strength and qualities demanded by a positive tooth-drive, while at the same time it possesses such flexibility that it will closely embrace and hug the surface of the wheel, the action most favorable for frictional drive.

It will be understood that the specific form of the belt may be variously modified and changed as regards the character, thickness and number of the different layers and the manner of arranging them. It will be further understood that the transverse connecting plates may be entirely dispensed with and the belt employed with the teeth of the wheel engaging directly in the holes therein, my invention not being limited to any specific form or detail, except in so far as such limitations are specified in the claim.

Having thus described my invention, what I claim is:—

The improved driving belt consisting of superposed layers of flexible material formed at intervals with tooth-engaging holes, a series of relatively stiff transverse members extending substantially the entire width of the belt and having holes therein and provided with thimbles surrounding said holes and extending into the holes in the layers of flexible material, and fastening devices extending through said transverse members and through the layers of the belt, said fastening devices serving to connect the transverse members to said layers and serving to connect said layers with each other; whereby the strains applied to the thimbles in driving the belt, will be distributed throughout the transverse extent of the same and to the several layers composing the belt.

In testimony whereof I have affixed my signature in presence of two witnesses.

HENRY HESS.

Witnesses:
THEO. H. MCCALLA,
NETTIE L. HAHN.